United States Patent Office 2,931,753
Patented Apr. 5, 1960

2,931,753

ORGANIC AMMONIUM SALTS OF POLY-SACCHARIDE CARBOXYLIC ACIDS

Ruth M. Chesbro, Archibald M. Erskine, and Bahman K. Shahrokh, Berkeley, Calif.; said Chesbro and said Shahrokh assignors to said Erskine No Drawing. Application November 18, 1953
Serial No. 392,992

34 Claims. (Cl. 167—22)

The present invention relates (1) to a new compound, which is a high molecular weight organic ammonium salt of a polysaccharide carboxylic acid and which is particularly useful as an antimicrobial agent, (2) to a method of making and using this compound and (3) to a new composition of matter containing this compound as an antimicrobial agent. By "organic ammonium salt of a polysaccharide carboxylic acid" is meant not only the amine salt but also the quaternary ammonium salt.

There are certain organic nitrogen containing compounds in the form of quaternary ammonium and amine salts having the following type formula

where R1 is an alkyl, alkenyl or alkaryl group containing from 8 to 20 carbon atoms in straight, branched or homocyclic arrangement and X is an anion rendering the compound soluble, such as a halide, sulfate or acetate radical. These water-soluble compounds have high antimicrobiological properties. We have produced a derivative of this nitrogen compound, (1) which contains the active antimicrobiological group

(2) which has a high molecular weight anion, (3) which is insoluble in water, oils and most organic solvents and (4) which in spite of characteristics (2) and (3), nevertheless has high antimicrobiological properties. It is surprising and quite unexpected to find a derivative of the nitrogen compound described retaining its strong antimicrobiological properties in the face of the accepted views and theories that the replacement of the water-solubilizing anion of such nitrogen compounds by anions of high molecular weight, and the consequent conversion to insolubility is attended with substantial or total loss or destruction of bactericidal, bacteristatic and fungistatic properties.

Our new compound is an organic ammonium salt of a polysaccharide carboxylic acid. More specifically, the polysaccharide carboxylate of the present invention, is a high molecular weight quaternary ammonium, or primary, secondary or tertiary amine salt of (1) carboxy alkyl cellulose, such as carboxy methyl cellulose and carboxy ethyl cellulose, (2) carboxy alkyl starch, such as carboxy methyl starch and carboxy ethyl starch, (3) alginic acid, (4) pectic (pectinic acid) or (5) similar natural and synthetic carboxylic acid derivative of a polysaccharide. The polysaccharide carboxylate of the present invention has a basic nucleus with the following formula

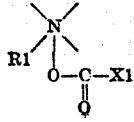

wherein $$(-O-\underset{\underset{O}{\|}}{C}-X1)$$

is part of one of the cyclic units of the polysaccharide anion or acid radical, X1 representing the lactol ring of this unit (usually a pyranose ring) and including the group, of any, connecting the carbonyl carbon atom of this acid radical to a carbon atom in the lactol ring, and this carbonyl carbon atom being either directly bonded to a carbon atom in the lactol ring, as in alginic acid and pectic acid, or bonded to the carbon atom in the lactol ring through the group ($CH_2O$) as in carboxyl methyl cellulose and in carboxy methyl starch or through higher alkoxy groups such as ($CH_2CH_2O$) as in carboxy ethyl cellulose and carboxy ethyl starch; and R1 is a high molecular weight alkyl or equivalent group, as indicated above in connection with the nitrogen containing compound from which the new compound is derived.

The ammonium derivative component of the polysaccharide carboxylate of the present invention may have the following formula

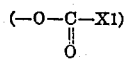

(To polysaccharide carboxylate residue)

in which R2, R3 and R4 are either (a) hydrogen, (b) alkyl, aryl, alkaryl, aralkyl or alkoxy ($OCH_3$) groups or (c) combination of (a) and (b).

The nitrogen compound residue in the polysaccharide carboxylate of the present invention may also have the formula

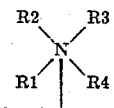

(To polysaccharide carboxylate residue)

 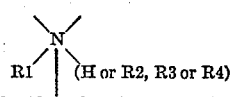

(To polysaccharide carboxylate residue)

in which two or three nitrogen valences or links, shown partially attached, form part of a heterocyclic ring structure, such as in derivatives of pyridine, quinoline, morpholine and imidazoline. In such cases, R1 will be a high molecular weight alkyl or equivalent group, as described above, and R2, R3 and R4 will be replaced by one or the other of these ring structures or by condensed heterocyclic ring structures.

Our insoluble quaternary ammonium and amine polysaccharide salts are prepared by reacting in aqueous solution a water-soluble quaternary ammonium or an amine salt of the character described with a water-soluble carboxylate salt of the polysaccharide. The reaction between these two water-soluble reactants in water solution produces a polysaccharide carboxylate, which is insoluble in water, in oil or in any other ordinary organic solvent, and which therefore precipitates out as the result of the reaction. The reactants are preferably taken in chemically equivalent proportions, so that no substantial excess of either remains after the reaction, unless as described later, a colloidal dispersion is desired. This, in general, avoids undesirable dispersion effects, which may cause filtration difficulties.

The reaction may be represented by the following general equation

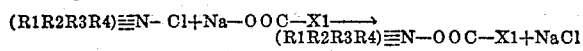

where R1R2R3R4 and X1 have the meanings given above.
Analagous equations may be written for quaternary ammonium and amine salts in which N is part of a heterocyclic ring. While the chloride is the more common anion used in the soluble quaternary ammonium and amine salts, other anions, such as bromide, iodide, sulfate, acetate, etc., may be employed. As equivalents to sodium, the polysaccharide carboxylates may be used in other water-soluble forms, such as the potassium or ammonium salts.

It is desirable that in the polysaccharide carboxylate of the present invention, there be at least an average of one nitrogen containing cation group $$(R_1-\overset{|||}{N}-)$$

for every five polysaccharide cyclic units. This assures a compound having the desired water and oil insolubility and the desired high antimicrobiological properties. There is no upper limit to the concentration of organic ammonium groups in our polysaccharide carboxylate, except as it might affect the viscosity of the reactants employed in the making of the carboxylate and the ease of handling them. It is generally desirable, that there be an average of no more than six nitrogen containing cation groups $$(R_1-\overset{|||}{N}-)$$

for every five polysaccharide cyclic units. Any greater concentration of these cation groups along the anionic polysaccharide chain, ordinarily necessitates the use of polysaccharide reactants of such high viscosity, in the process of making the compound of the present invention, as may render these reactants difficult to handle.

One form of sodium polysaccharide carboxylate (Na—OOC—X1) which may be employed as a reactant in the process of making the compound of the present invention is a derivative of cellulose. Cellulose consists of anhydro-glucose units, joined by glycosidic linkages, each glucose unit comprising three free hydroxyl groups, one being of primary alcoholic nature ($CH_2OH$) and the other two of secondary alcoholic nature (OH) connected directly to respective carbon atoms in a lactol (pyranose) ring. The required sodium polysaccharide carboxylate may be prepared from this cellulose by treating the cellulose with caustic soda to convert the (OH) groups to (ONa) groups. This intermediate product is then reacted with sufficient sodium salt of monochloroacetic acid ($ClCH_2COONa$) to convert the (ONa) groups to ($OCH_2COONa$) groups and to form thereby the sodium polysaccharide carboxylate to be employed in the preparation of the compound of the present invention. This sodium polysaccharide carboxylate which is a sodium salt of carboxymethyl cellulose will have the following glucose group formula at the original hydroxyl points of the polysaccharide (Anhydro-glucose ring)
|
$CH_2O—CH_2COONa$ At original primary alcohol region $OCH_2COONa$
|
(Anhydro-glucose ring)

At one of the two original secondary alcohol regions

The reactions described in forming the sodium polysaccharide carboxylate should desirably be so carried out, that at least 0.2 mol of the three (3) original (OH) groups in each anhydro-glucose unit of the original cellulose are converted to ($OCH_2COONa$) groups. This is the equivalent of an average of at least one ($OCH_2COONa$)

group for every five anhydro-glucose units. The conversion of the (OH) groups of the cellulose to ($OCH_2$—COONa)

groups renders the resulting product water-soluble and reactive. When this product is reacted with equivalent amounts of the high molecular weight organic ammonium salt described, the resulting organic ammonium salt of polysaccharide carboxylic acid, will have an average of at least one organic ammonium cationic residue for every five anhydro-glucose units.

Ordinarily, it is desirable that the reactions described in forming the sodium polysaccharide carboxylate be carried out, so that no more than 1.2 mols of the three (3) original (OH) groups in each anhydro-glucose unit of the original cellulose are converted to ($OCH_2COONa$) groups. This is the equivalent of an average of no more than six ($OCH_2COONa$) groups for every five anhydroglucose units. Any higher degree of substitution might produce a sodium polysaccharide carboxylate, too viscous to handle conveniently and effectively.

Starch is a compound similar to cellulose, in that each anhydro-glucose unit has one primary alcohol group ($CH_2OH$) and two secondary alcohol groups (OH) connected directly to respective carbons in the lactol (pyranose) ring of the glucose unit. This starch may be converted to the sodium salt of carboxy methyl starch, as described in connection with the cellulose derivative, with the same degree of substitution, to produce the sodium polysaccharide carboxylate serving as one of the reactants in the preparation of the compound of the present invention.

Alginic acid and pectic (or pectinic) acid are natural products having carbohydrate (polysaccharide) type structures containing pyranose units, each unit having a single naturally occurring (COOH) group bonded to a carbon in the lactol ring of the unit. Alginic acid is derived from Pacific kelp and is converted commercially into the sodium salt which is water-soluble and reactive and therefore suitable as a reactant in the preparation of the compound of the present invention. Pectic acid is derived from fruit products, such as apples and citrus fruits, and can be converted into the sodium salt for use as a reactant in the preparation of the compound of the present invention.

In the case of the sodium salt of alginic acid and the sodium salt of pectic acid, there is preferably substantially 100% substitution, so that there will be an average of one (COONa) group for every pyranose unit. These sodium salts when reacted with equivalent amount of the high molecular weight organic ammonium salt described, will produce a polysaccharide carboxylate, in which the ammonium cation residues average about one per pyranose unit. This is well within the range of concentration found suitable for the compound of the present invention.

Our quaternary ammonium and amine salts of polysaccharide carboxylic acids represent a new class of compounds which exhibit marked insolubility in both water and ordinary organic solvents, and which therefore can be employed as an antimicrobiological agent in cases where the original quaternary ammonium and primary, secondary and tertiary amine salts, although possessing high bactericidal, bacteristatic, fungistatic and algistatic properties, cannot be used. The only common solvent which will dissolve the new compound to any appreciable extent is, methanol, and even then, its maximum solubility in this solvent is only about one percent. In spite of this insolubility, the new compound surprisingly shows distinct and useful bactericidal, bacteristatic, fungistatic and algistatic properties. Moreover, these insoluble quaternary ammonium and amine salts of polysaccharide carboxylic acids show resinous characteristics with a pronounced tendency to form firmly adhering films on drying.

Examples of organic ammonium salts of polysaccharide carboxylic acids of the present invention, which are insoluble in water and ordinary organic solvents, and which possess antimicrobiological properties are as follows:

Dodecyl dimethyl benzyl ammonium carboxy methyl cellulose (commercially dodecyl in the reactant employed in making the compound of the present invention is also referred to as "alkyl ($C_8H_{17}$–$C_{18}H_{37}$)."

Lauryl isoquinolinium carboxy methyl cellulose
N-alkylbenzyl trimethyl ammonium carboxy methyl cellulose
Dodecyl amine carboxy methyl cellulose
Dodecyl imino propylene amine carboxy methyl cellulose
Cetyl dimethyl benzyl ammonium carboxy methyl cellulose
Alkyl ($C_8$–$C_{18}$) dimethyl 3,4 dichloro benzyl ammonium carboxy methyl cellulose
Octadecyl trimethyl ammonium carboxy methyl cellulose
Di-alkyl ($C_8$–$C_{18}$) dimethyl ammonium carboxy methyl cellulose
Alkenyl ($C_{16}$–$C_{20}$) dimethyl ethyl ammonium carboxy methyl cellulose
Alkenyl trimethyl ammonium carboxy methyl cellulose
Alkyl benzyl hydroxyethyl imidazolinium carboxy methyl cellulose
Di-isobutyl phenoxy ethoxy ethyl dimethyl benzyl ammonium carboxy methyl cellulose
Cetyl pyridinium carboxy methyl cellulose
Stearamido methyl pyridinium carboxy methyl cellulose
N-ethyl N-"soya" morpholinium carboxy methyl cellulose (derived from alkyl found in soya bean oil)
Di-"hydrogenated tallow" dimethyl ammonium carboxy methyl cellulose (derived from animal fats)
Secondary "Coco" amine carboxy methyl cellulose (derived from coconut oil)
Dimethyl "Coco" amine carboxy methyl cellulose (derived from coconut oil)
Tertiary alkyl ($C_{18}$–$C_{24}$) primary amine carboxy methyl cellulose
Rosin amine (D) carboxy methyl cellulose
2-heptadecyl glyoxalidine carboxy methyl cellulose
Dodecyl dimethyl benzyl ammonium carboxy methyl starch
Dodecyl dimethyl benzyl ammonium alginate
N-alkylbenzyl trimethyl ammonium alginate
N-alkylbenzyl trimethyl ammonium pectinate Di-quaternary ammonium compounds, as well as di-amines, containing long chain alkyl groups, form corresponding insoluble quaternary ammonium and amine polysaccharide carboxylates. Such nitrogen derivatives are included within the scope of this invention. In these cases, both nitrogens are capable of combining with the polysaccharide carboxylate anions. Examples of such combinations are:

N-(2-dimethyl dodecyl ammonium ethyl)pyridinium dichloride (U.S. Patent 2,617,806) reacted with sodium carboxy methyl cellulose
Dodecyl-imino-propylene amine acetate (from Armour and Company's "Duomeen 12") reacted with sodium carboxy methyl cellulose The following examples illustrate certain ways in which the principle of the invention has been applied, but are not to be construed as limiting the invention:

EXAMPLE 1.—PREPARATION OF DODECYL DIMETHYL BENZYL AMMONIUM CARBOXY METHYL CELLULOSE

A solution was prepared comprising 1 liter of 1% dodecyl dimethyl benzyl ammonium chloride of good commercial grade (Onyx Oil and Chemical Co.) in tap water. To this, while being vigorously agitated, was slowly added 475 ml. of a 1% aqueous solution of the sodium salt of carboxy methyl cellulose (Hercules' CMC–70 Low Viscosity).[1] A white precipitate formed immediately, which after completion of addition of the carboxy methyl cellulose solution was recovered by filtration. Tests on small portions of the filtrate with the two reactants showed no excess of either present, which checked the reacting proportions determined in a series of preliminary experiments.

The precipitate was washed well on the filter to remove sodium chloride and dried in an oven at 50–60° C. A yield of 11.8 grams of dodecyl dimethyl benzyl ammonium carboxy methyl cellulose was obtained in the form of a pale brown solid which was tough and resinous in nature.

EXAMPLE 2.—PREPARATION OF LAURYL ISOQUINOLINIUM CARBOXY METHYL CELLULOSE

To 1 liter of 1% aqueous solution of lauryl isoquinolinium bromide (Onyx Oil and Chemical Company's Isothan Q-15) was slowly added with good agitation 400 ml. of a 1% aqueous solution of the sodium salt of carboxy methyl cellulose. The brownish precipitate which formed was quite sticky and showed a tendency to precipitate in strings. After filtering, the product was washed well with water and then dried on the filter paper at about 50° C. When dry, the yield of lauryl isoquinolinium carboxy methyl cellulose was found to be 11.5 grams. It was dark, reddish brown in color. The product was rather hard and tough and showed a marked tendency to adhere to the paper.

EXAMPLE 3.—PREPARATION OF N-ALKYLBENZYL TRIMETHYL AMMONIUM CARBOXY METHYL CELLULOSE

A solution was prepared comprising 1 liter of 1% N-alkylbenzyl trimethyl ammonium chloride (Oronite Chemical Company's ATM-50) in tap water. To this was slowly added with vigorous agitation 550 ml. of a 1% solution of the sodium salt of carboxy methyl cellulose. The white, flocculent precipitate which formed was filtered, washed thoroughly on the filter and then dried at 50–60° C. A yield of 10.9 grams of N-alkylbenzyl trimethyl ammonium carboxy methyl cellulose was obtained. This was a hard, resinous material with a pale cream color.

EXAMPLE 4.—PREPARATION OF DODECYL AMINE CARBOXY METHYL CELLULOSE

To 900 ml. of a 1% solution in distilled water of the sodium salt of carboxy methyl cellulose was added with good agitation 667 ml. of a 1.5% solution of dodecyl amine acetate (Armour's Armac 12) in distilled water. The flocculent white precipitate was allowed to settle and was then washed three times by decantation with distilled water. The precipitate was finally transferred to a filter and washed again. On drying, a yield of 14.2 grams of dodecyl amine carboxy methyl cellulose was obtained. It was pale brown in color and rather hard and horny in character. This example illustrates the preparation of a long chain primary amine salt of carboxy methyl cellulose.

EXAMPLE 5.—PREPARATION OF DODECYL IMINO PROPYLENE AMINE CARBOXY METHYL CELLULOSE

A solution of dodecyl-imino-propylene amine acetate was prepared by dissolving 7.5 grams of Armour's "Duomeen 12," ($C_{12}H_{25}$)—NH—$(CH_2)_3$—$NH_2$, in 50 ml. of 10 percent acetic acid, to which was then added distilled water to make a total volume of 375 ml. This amine acetate solution was run slowly with good agitation into 1350 ml. of a solution in distilled water containing 13.5 grams of the sodium salt of carboxy methyl cellulose (Hercules' CMC 70–Low). The white, semi-fibrous precipitate was allowed to settle and was then washed three times by decantation with distilled water. After filtration, the filter cake was dried at 50–55° C., giving a reddish-brown, somewhat resinous final product in 17.6 grams yield.

---

[1] A cellulosic sodium salt with 70 degree of substitution, i.e. average of 0.7 of one out of every three (OH) groups converted.

The reacting ratio of sodium carboxy methyl cellulose to Duomeen 12 (calculated as free amine) was found in separate experiments to be 1.6–1.7 parts by weight of sodium carboxy methyl cellulose to 1.0 part Duomeen 12. In the above example, the proportions of reactants used (1.8 to 1.0) were, therefore, slightly in excess as to the carboxy methyl cellulose used, and the filtrate showed in a confirmatory test a slight excess of this reactant. The experimentally determined reacting ratio of 1.6–1.7/1.0 corresponds to a theoretical combination of 2 mols carboxy methyl cellulose with 1 mol Duomeen 12, indicating that both nitrogens enter the reaction.

EXAMPLE 6.—PREPARATION OF DODECYL DIMETHYL BENZYL AMMONIUM CARBOXY METHYL STARCH

A solution was prepared comprising 1200 ml. of 1% sodium salt of carboxy methyl starch of medium viscosity (National Starch Products' CMS–M) in distilled water. To this was slowly added with vigorous agitation 500 ml. of a 2% solution in distilled water of dodecyl dimethyl benzyl ammonium chloride. For a considerable period, the reaction product formed a colloidal dispersion but precipitated partially toward the end of the addition of the second reactant. The suspension was then heated for a short time at 50° C., which produced complete coagulation an dgood settling. The precipitate was filtered, washed with distilled water, and dried at 50–55° C. A yield of 10.0 grams of dodecyl dimethyl benzyl ammonium carboxy methyl starch was obtained. Although rather hard and resinous, it was readily ground to a fine powder.

EXAMPLE 7.—PREPARATION OF DODECYL DIMETHYL BENZYL AMMONIUM ALGINATE

An aqueous solution was prepared comprising 650 ml. of 0.5% sodium alginate of good commercial grade. To this was added slowly with vigorous agitation 500 ml. of a 1% aqueous solution of dodecyl dimethyl benzyl ammonium chloride (Onyx). A white flocculent precipitate formed which filtered quite readily. After washing on the filter several times with tap water the product was dried at 50° C. A yield of 6.6 grams of dodecyl dimethyl benzyl ammonium alginate was obtained in the form of a pale yellowish and slightly tacky solid, which was, however, rather readily ground to a powder. The latter showed a chlorine content of 0.3%, as compared with 10.4% chlorine in the dodecyl dimethyl benzyl ammonium chloride reactant.

EXAMPLE 8.—PREPARATION OF N-ALKYLBENZYL TRIMETHYL AMMONIUM ALGINATE

A solution was prepared comprising 700 ml. of 0.5% sodium alginate in distilled water. To this was added slowly with vigorous agitation 500 ml. of a 1% solution of N-alkylbenzyl trimethyl ammonium chloride (Oronite) in distilled water. The alginate solution was kept warmed to 35–40° C. during the precipitation in order to reduce the viscosity. The precipitate was filtered and washed with several portions of distilled water and finally dried at 50–55° C. A yield of 5.75 grams of N-alkylbenzyl trimethyl ammonium alginate was obtained.

EXAMPLE 9.—PREPARATION OF N-ALKYLBENZYL TRIMETHYL AMMONIUM PECTINATE

A solution was prepared comprising 1 liter of 1% N-alkylbenzyl trimethyl ammonium chloride (Oronite) in distilled water. Another solution was prepared by dissolving 5.0 g. pectic acid (Eastman, technical grade) in 477 ml. of distilled water containing 0.9 g. sodium hydroxide, giving 500 ml. of 1% pectic acid in the form of sodium salt. The pH of the latter solution was adjusted to 8.0–8.5. This sodium pectinate solution was then run into the first solution with good agitation. A white flocculent precipitate was formed which was readily filtered and washed on the funnel with distilled water to a faint chloride test. After drying at 55° C., a yield of 11.5 grams of N-alkylbenzyl trimethyl ammonium pectinate was obtained. This was a white resinous material which was ground rather readily to a powder.

As already indicated, the insoluble quaternary ammonium and amine salts of polysaccharide carboxylic acids of the present invention show resinous characteristics with a pronounced tendency to form firmly adhering films on drying. We have found that these films, when produced on cellulosic and other surfaces, show marked fungistatic properties.

The insoluble salts may also be produced in the form of colloidal dispersions by well-known methods. More particularly, this can be accomplished by vigorously stirring the material in the form of wet filter cake with additional water containing non-ionic dispersing agents. Alternatively, a water-soluble salt of a polysaccharide carboxylic acid in low concentration may be used as the dispersing agent. In the latter case, it is possible in many instances to precipitate the compounds by using a slight excess of the polysaccharide anion and then proceed to the colloidal dispersion step without filtration. These colloidal dispersions have excellent bactericidal power, as shown by the following tests.

Table I

| Compound | Concentration of Dispersion Tested, Percent | Phenol Coefficient (100% Basis) (S. Aureus) |
| --- | --- | --- |
| 1. Dodecyl-dimethyl-benzyl ammonium carboxy methyl cellulose | 1.0 | 200 |
| 2. Mixed alkyl ($C_8$-$C_{18}$)-dimethyl-3,4, dichlorobenzyl ammonium and alkenyl ($C_{16}$-$C_{20}$)-dimethyl-ethyl-ammonium carboxy methyl cellulose (in ratio 5:1) | 0.1 | 200 |
| 3. N-alkylbenzyl-trimethyl ammonium alginate | 1.0 | 200 |
| 4. N-alkylbenzyl-trimethyl ammonium alginate | 0.1 | 300 (avg.) |
| 5. Dodecyl-dimethyl-benzyl ammonium pectinate | 0.1 | 300 (avg.) |

The foregoing tests for phenol coefficient against *Staphylococcus aureus* were carried out by the official method set up by the Food and Drugs Administration, U.S. Department of Agriculture, as described in A.O.A.C., Methods of Analysis, 7th edition, page 88. An accepted modification of this method was followed in which "Letheen" broth was used for the subculture.

Tests also showed that these colloidal dispersions have excellent bacteristatic action. For example, a dispersion of dodecyl-dimethyl-benzyl ammonium pectinate inhibited growth of *S. aureus* at a dilution of 1:50,000–1:100,000 and of *S. typhosa* at 1:50,000–1:75,000. Similarly, a dispersion of N-alkylbenzyl-trimethyl ammonium alginate inhibited growth of the two bacteria at these same dilutions.

These results were quite unexpected since, in view of the extreme insolubility, no appreciable amount of organic ammonium ion would be expected to exist in solution, and no strong surface active properties are evident in the compounds. The bactericidal properties of these compounds, therefore, seem to be inherent in the high molecular weight quaternary ammonium and amine radicles in the insoluble salts of the polysaccharide carboxylic acids.

By virtue of the unique properties of these high molecular weight quaternary ammonium and amine salts of polysaccharide carboxylic acids, they have wide fields of utility. For example, cellulosic surfaces in the form of sheets or filaments may be protected from the action of mildew or other fungi. Practical forms of such surfaces are fabrics, yarns, cordage, paper, cardboard, etc. The insoluble fungistatic agents of this invention may be applied in the form of colloidal dispersions or by other suitable methods.

A test for the fungistatic action of N-alkylbenzyltrimethyl ammonium alginate was made by immersing a piece of unbleached muslin in a 1% colloidal dispersion of the compound for about 10 minutes. After rinsing off the excess of dispersion with water, the treated cloth was allowed to drain and dry. It was then tested for growth of *Chaetomium globosum* and showed completely negative results over a period of six weeks' incubation. A control untreated cloth tested in the same way gave the usual normal growth of the organism on it. This test and those described in the paragraphs below were made following the U.S. Army, Ordnance Department, Specification AXS-1244 (March 1944).

We have found another simple and effective method of application of these compounds, which involves treating at ordinary temperature the fabric or other form of cellulosic material successively with solutions of the soluble reactants in separate baths, whereby the insoluble fungistatic compound is formed in situ in intimate contact with the surface. For example, the cellulosic material, whatever the form may be, is first dipped into or run through a dilute solution of the soluble quaternary ammonium or amine salt. After a short contact, the excess of solution is squeezed out, and the material is then dipped into or run through a dilute solution of the salt of the polysaccharide carboxylic acid. After squeezing out most of the excess of unreacted second reactant, the coated material is preferably soaked in water for a period of time to remove any of this reactant still adhering to the surface of the material. The material is then dried for use.

The order of treatment indicated above is preferable to the reverse order of applying the two reactants, since cellulose shows substantive properties toward high molecular weight quaternary ammonium and amine salts in solution, and a better penetration is insured for the reaction product than when the polysaccharide carboxylate is applied first.

The following table summarizes some fungistatic tests carried out on fabrics treated according to the above two-step method.

ment type, such as used in the wrapping of butter and similar food products) were treated by the above two-step method successively with 1% dodecyl-dimethyl-benzyl ammonium chloride and 1% sodium salt of carboxy methyl cellulose, whereby dodecyl-dimethyl-benzyl ammonium carboxy methyl cellulose was formed on the surface of the paper. Fungistatic tests with cultures of *Chaetomium globosum* showed no growth of the organism over a four weeks' incubation period, whereas control test papers gave a copious growth on their surface.

Tests for algistatic properties showed that N-alkylbenzyl trimethyl ammonium alginate and dodecyl dimethyl benzyl ammonium carboxy methyl cellulose in emulsion form are effective against a pure culture of Chlorella at a concentration of 10 parts per million.

The properties of these new quaternary ammonium and amine salts of polysaccharide carboxylic acids indicate a wide range of usefulness for them, as for example in the following fields:

(1) Mildew-proofing and prevention of the growth of other fungi on cellulosic fabrics.

(2) Prevention of mildewing and other fungus growths on paper of various types, with particular value in the food wrapping field.

(3) Fungistatic treatment of cardboard, fibre board cartons, etc.

(4) Preservation of cellulosic felts.

(5) Wood preservation.

(6) Prevention of mildewing and rotting of cordage, rope, fish nets and similar products.

(7) Similar preservation of canvas, awnings, sails, etc.

(8) Slime control in the manufacture of paper and similar cellulosic products.

(9) Use in air filters to catch and inactivate bacteria and the spores of fungi.

(10) Preservative coatings on food products, such as fruit, eggs, etc., whereby molds and bacterial growth are prevented by the application of fungistatic and bacteristatic insoluble films or powders.

(11) Prevention of mold growth in latex paints, as well as use in oil paints as fungicides.

(12) Prevention of mold growth in adhesives.

(13) Uses in the medical field for the preparation of

*Table II*

| Compound (Formed on Fabric) | Concentration of Reactants | Type of Fabric | Growth of *Chaetomium globosum* After 4 Weeks Incubation |
|---|---|---|---|
| 1. Dodecyl-dimethyl-benzyl ammonium carboxy methyl cellulose. | 1.0% each | Cotton (sail cloth) | Negative. |
| 2. Dodecyl-dimethyl-benzyl ammonium carboxy methyl cellulose. | 0.1% each | ----do---- | Do. |
| 3. Dodecyl-dimethyl-benzyl ammonium carboxy methyl cellulose. | 1.0% each | Unbleached muslin | Do. |
| 4. Dodecyl amine carboxy methyl cellulose (an amine salt). | ----do---- | Cotton (sail cloth) | Do. |
| 5. Dodecyl-dimethyl-benzyl ammonium alginate. | 1.0% quaternary ammonium salt, 0.5% alginate. | ----do---- | Do. |
| 6. Lauryl isoquinolinium carboxy methyl cellulose. | 0.1% each | ----do---- | Do. |

Control tests with untreated cloth in the above experiments gave the usual heavy growth of *Chaetomium globosum*.

Our method of coating with insoluble films of polysaccharide carboxylates gives physical properties in the finished goods superior to those in the case of cellulosic materials impregnated merely with soluble high molecular weight quaternary ammonium salts. This superiority lies principally in the fact that the final surface is dry but still flexible and, in particular, it does not show the softening and moisture absorbing properties induced by treatment with soluble quaternaries and amine salts.

To illustrate the fungistatic action of these compounds on paper, two types (a hardened filter paper and a parchbacteristatic surgical gauze and disposable paper tissues.

(14) Uses in the pharmaceutical field in bacteristatic ointments, salves, mouth washes, hand lotions, dusting powders and similar products.

(15) Uses as algistatic agents.

(16) Additives to lubricating oils used in food machinery to prevent growth of bacteria and fungi.

(17) Use as germicidal additives in non-ionic detergents, particularly those adaptable for use in solid form.

What is claimed is:

1. An antimicrobiological, high molecular weight quaternary ammonium salt of a polysaccharide carboxylic acid, insoluble in water, oil and ordinary organic solvents and having a quaternary ammonium cation with a radical containing a minimum of eight carbon atoms bonded to the nitrogen atom in said cation.

2. A water-insoluble, alkali insoluble compound having a nucleus with the formula

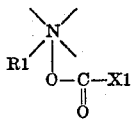

wherein R1 is a radical of the class consisting of alkyl, alkenyl and alkaryl radicals containing from 8 to 20 carbon atoms and X1 represents the ring structure of a polysaccharide unit including any groups connecting a carbon atom of said ring structure to the carbonyl carbon atom of said nucleus, said compound having antimicrobiological properties derived mainly from the group

3. A water-insoluble, alkali insoluble compound having a nucleus with the formula

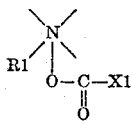

wherein R1 is a radical of the class consisting of alkyl, alkenyl and alkaryl radicals containing from 8 to 20 carbon atoms and X1 is the pyranose ring structure of an anhydro-glucose unit of a polysaccharide, and includes any group connecting a carbon atom in said ring structure to the carbonyl carbon atom of said nucleus, said compound having antimicrobiological properties derived mainly from the group

4. A compound as described in claim 3, wherein X1 is the pyranose ring structure of an anhydro-glucose unit of a carboxy alkyl cellulose and includes an alkoxy group connecting a carbon atom in said ring structure to the carbonyl carbon atom of said nucleus.

5. A compound as described in claim 3, wherein X1 is the pyranose ring structure of an anhydro-glucose unit of a carboxy alkyl starch and includes the group connecting a carbon atom in said ring structure to the carbonyl carbon atom of said nucleus.

6. An organic ammonium salt of carboxy alkyl starch, insoluble in water and having a radical in its ammonium group with a minimum of eight carbon atoms bonded to the nitrogen atom in said group.

7. A water-insoluble salt of carboxy alkyl starch having a carboxy alkyl starch anion consisting of a chain of anhydro-glucose units, at least some of said units each carrying a carboxylic group, and a series of cations attached to said chain through said carboxylic groups and each having the nucleus

wherein R1 is a radical of the class consisting of alkyl, alkenyl and alkaryl radicals containing from 8 to 20 carbon atoms.

8. A compound as described in claim 3, wherein X1 is a pyranose ring structure of a pectinate, the carbonyl carbon atom of said nucleus being connected directly to a carbon atom in said ring structure.

9. An organic ammonium salt of pectic acid, insoluble in water and having a radical in its ammonium group with a minimum of eight carbon atoms bonded to the nitrogen atom in said group.

10. A water-insoluble salt of pectic acid having an anion consisting of a chain of cyclic units each including a pyranose ring each carrying a carboxylic group directly connected to a ring carbon atom, and a series of cations attached to said chain through said carboxylic groups and each having the nucleus

wherein R1 is a radical of the class consisting of alkyl, alkenyl and alkaryl radicals containing from 8 to 20 carbon atoms.

11. A compound as described in claim 3, wherein X1 is a pyranose ring structure of an alginate, the carbonyl carbon atom of said nucleus being connected directly to a carbon atom in said ring structure.

12. An organic ammonium salt of alginic acid, insoluble in water and having a radical in its ammonium group with a minimum of eight carbon atoms bonded to the nitrogen atom in said group.

13. A water-insoluble salt of alginic acid having an anion consisting of a chain of cyclic units each including a pyranose ring each carrying a carboxylic group directly connected to a ring carbon atom, and a series of cations attached to said chain through said carboxylic groups and each having the nucleus

wherein R1 is a radical of the class consisting of alkyl, alkenyl and alkaryl radicals containing from 8 to 20 carbon atoms.

14. The method of preparing an oil, alkali and water-insoluble organic ammonium salt of a polysaccharide carboxylic acid which comprises reacting in water solution, an organic ammonium antimicrobiological compound of the type having a nucleus with the formula

wherein R1 is a group from the class consisting of alkyl, alkenyl and alkaryl radicals containing from 8 to 20 carbon atoms and X is an anion rendering the compound water-soluble, with a water-soluble salt of a polysaccharide carboxylic acid, to produce an oil, alkali and water-insoluble precipitate formed by combining the cation of said ammonium compound with the anion of said polysaccharide salt, and having antimicrobiological properties derived mainly from said cations.

15. The method of preparing an oil and water-insoluble organic ammonium salt of a polysaccharide carboxylic acid as described in claim 14, wherein the reactants are added together in substantially equivalent proportions.

16. The method of preparing an oil and water-insoluble organic ammonium salt of a polysaccharide carboxylic acid as described in claim 14, wherein the water-soluble salt of a polysaccharide carboxylic acid is a salt of carboxy alkyl cellulose.

17. The method of preparing an oil and water-insoluble organic ammonium salt of a polysaccharide carboxylic acid as described in claim 14, wherein the water-soluble salt of a polysaccharide carboxylic acid is a salt of carboxy alkyl starch.

18. The method of preparing an oil and water-insoluble organic ammonium salt of a polysaccharide carboxylic acid as described in claim 14, wherein the water-soluble salt of a polysaccharide carboxylic acid is a salt of pectic acid.

19. The method of preparing an oil and water-insoluble organic ammonium salt of a polysaccharide carboxylic acid as described in claim 14, wherein the water-soluble salt of a polysaccharide carboxylic acid is a salt of alginic acid.

20. The method of producing a colloidal dispersion having antimicrobiological properties, which comprises preparing by the reaction in water solution between a water-soluble organic ammonium salt having in its ammonium group a radical containing a minimum of eight carbon atoms bonded to the nitrogen atom in said group and a water-soluble salt of a polysaccharide carboxylic acid and by filtration, a water and oil-insoluble wet filter cake consisting essentially of the organic ammonium salt of the polysaccharide carboxylic acid, and stirring this cake with additional water containing a dispersing agent.

21. The method as described in claim 20, wherein the dispersing agent is a water-soluble salt of a polysaccharide carboxylic acid.

22. The method of producing a composition having antimicrobiological properties, which comprises reacting in water solution a water-soluble organic ammonium salt having in its ammonium group a radical containing a minimum of eight carbon atoms bonded to the nitrogen atom in said group and having antimicrobiological properties with a water-soluble salt of a polysaccharide carboxylic acid with the latter salt in slight excess of equivalent proportions and colloidally dispersing the reaction product in the aqueous medium.

23. The method of treating a material to protect it against the action of microbials, which comprises applying separately and in succession two reactants in water solution, to form in situ upon said material, the reaction product of said reactants, one of said reactants comprising a solution of a water-soluble, antimicrobiological, organic ammonium compound having in its ammonium group a radical containing a minimum of eight carbon atoms bonded to the nitrogen atom in said group and the other reactant comprising a water-soluble salt of a polysaccharide carboxylic acid, whereby there is precipitated upon said material, a water and oil-insoluble high molecular weight organic ammonium salt of a polysaccharide carboxylic acid.

24. Dodecyl dimethyl benzyl ammonium carboxymethyl cellulose.

25. A water-insoluble, alkali-insoluble salt of a polysaccharide carboxylic acid having a polysaccharide anion consisting of a chain of cyclic units, at least some of said units each carrying a carboxylic group, and a series of cations attached to said chain through said carboxylic groups and each having the nucleus

wherein R1 is a radical of the class consisting of alkyl, alkenyl and alkaryl radicals containing from 8 to 20 carbon atoms, said salt having antimicrobiological properties derived mainly from the cations, the number of cations averaging at least one for every five cyclic polysaccharide units.

26. A salt of a polysaccharide carboxylic acid as described in claim 25, wherein the number of cations are approximately equal to the number of carboxylic groups carried by the cyclic polysaccharide units.

27. A water-insoluble, alkali insoluble salt of carboxy alkyl cellulose having a carboxy alkyl cellulose anion consisting of a chain of anhydro-glucose units, at least some of said units each carrying a carboxylic group, and a series of cations attached to said chain through said carboxylic groups and each having the nucleus

wherein R1 is a radical of the class consisting of alkyl, alkenyl and alkaryl radicals containing from 8 to 20 carbon atoms, said salt having antimicrobiological properties due to said cations, the number of cations averaging at least one for every five anhydro-glucose units.

28. The method of combatting microbials, which comprises treating material liable to attack by said microbials with the compound of claim 2.

29. The method of combatting microbials, which comprises treating materials liable to attack by said microbials with the compound of claim 2 in the form of a colloidal dispersion.

30. The method of combatting microbials on the surface of a material liable to attack by said microbials, which comprises applying to said surface the compound of claim 2 in colloidal dispersion and drying said surface.

31. The method of treating cellulosic surfaces against the action of microbials, which comprises treating such surfaces with the compound of claim 2.

32. The method of combatting microbials, which comprises treating material liable to attack by said microbials with the compound of claim 1.

33. A quaternary ammonium salt of a polysaccharide carboxylic acid as described in claim 1, wherein the cation is N-alkylbenzyl trimethyl ammonium.

34. A water-insoluble antimicrobiological high molecular weight quaternary ammonium salt of a polysaccharide carboxylic acid anion and a quaternary ammonium cation, said cation having high antimicrobiological properties.

References Cited in the file of this patent

UNITED STATES PATENTS

| | | |
|---|---|---|
| 2,106,298 | Dreyfus | Jan. 25, 1938 |
| 2,158,485 | Preble | May 16, 1939 |
| 2,233,475 | Dreyfus | Mar. 4, 1941 |
| 2,314,277 | Hurd | Mar. 16, 1943 |
| 2,561,418 | Ryan | July 24, 1951 |
| 2,614,634 | Lea et al. | Oct. 21, 1952 |
| 2,617,707 | Daul et al. | Nov. 11, 1952 |
| 2,688,598 | McNeely | Sept. 7, 1954 |

OTHER REFERENCES

Surface Active Agents by Schwartz and Perry, Interscience Publishers, Inc., New York (1949), page 153 relied on.